Dec. 22, 1964  D. CAPP  3,161,963
LINEAR DIMENSION GAUGES
Filed May 1, 1962  2 Sheets-Sheet 1

Inventor
DESMOND CAPP
By
Holcombe, Wetherill + Brisbois
Attorneys

Dec. 22, 1964   D. CAPP   3,161,963
LINEAR DIMENSION GAUGES
Filed May 1, 1962   2 Sheets-Sheet 2

Inventor
DESMOND CAPP
By
Holcombe, Wetherill + Brisebois
Attorneys

United States Patent Office 3,161,963
Patented Dec. 22, 1964

3,161,963
LINEAR DIMENSION GAUGES
Desmond Capp, % Verdict Gauge Works, Thames Road, Crayford, Kent, England, assignor of one-half to A. Capp & Son Limited, Crayford, Kent, England
Filed May 1, 1962, Ser. No. 192,037
Claims priority, application Great Britain, Apr. 4, 1962, 12,969/62
2 Claims. (Cl. 33—172)

This invention relates to linear dimension gauges of the kind comprising a pivotally mounted spring pressed stylus operated by the surface of the workpiece and adapted to operate through a suitable transmission the spindle of the indicator needle, the stylus being movable into a number of tilted positions relatively to the body of the gauge. The object of tilting the stylus is to bring its free end below the body of the gauge to enable a workpiece to pass, if desired, lengthwise of the body. When the workpiece is to be passed transversely and in front of the body the stylus can be disposed in an untilted position, i.e. it extends in the same plane as the body.

In linear dimension gauges of the kind referred to the free end of the stylus has hitherto been made in the form of a spherical ball. The disadvantage of this arrangement is that when the stylus is in a tilted position the distance between the working centres, i.e. the pivotal centre of the stylus and the contact point of the ball with the surface of the workpiece, is reduced and as a consequence the indicator gives an incorrect reading, the inaccuracy increasing with increasing angles of tilt.

The object of the invention is to overcome this disadvantage.

With the foregoing object in view in a linear dimension gauge of the kind referred to made in accordance with the invention the free end of the stylus is tapered, the taper being such that when the stylus is tilted the horizontal distance between the working centres as above defined remains constant.

In the accompanying drawings which illustrate how the invention may be carried into effect, FIG. 1 illustrates a conventional linear dimension gauge of the kind referred to with the stylus extending in the plane of the body of the gauge.

Figure 6:
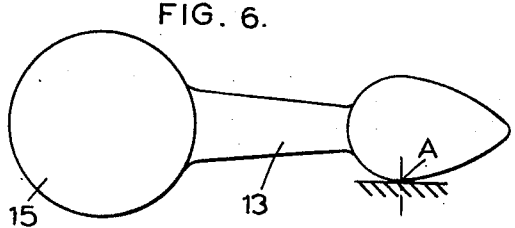
Figure 7:
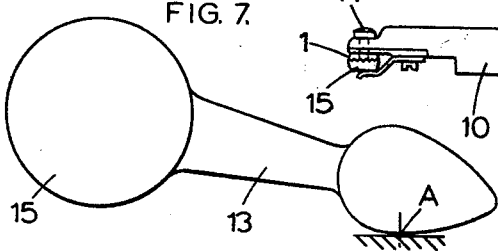
Figure 11:
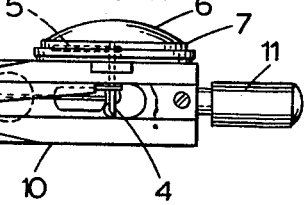
Figure 8:
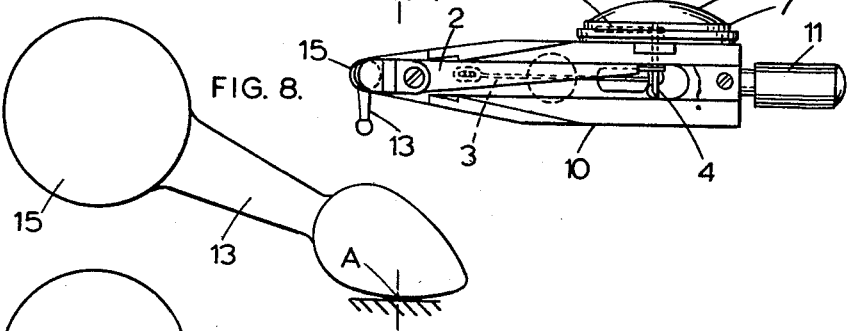
Figure 9:
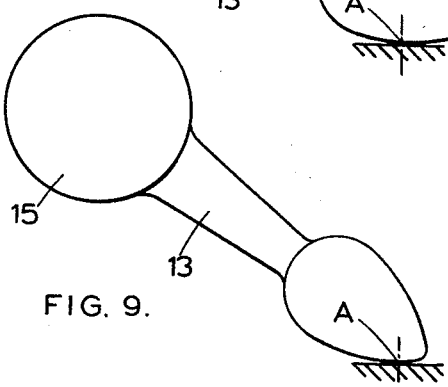

FIGS. 6, 7, 8 and 9 illustrate different positions of the stylus, FIG. 6 showing the stylus in an untilted position and FIGS. 7, 8 and 9 showing the stylus tilted into positions inclined respectively at angles of 12°, 24° and 36°.

Figure 10:
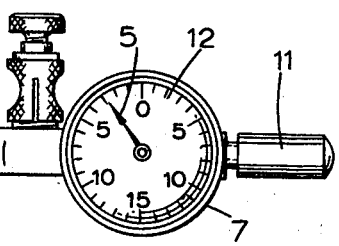

FIG. 10 is a plan view of a conventional gauge such as shown in FIGS. 1 to 3 and FIG. 11 is a side elevational view of the gauge shown in FIG. 10 with the cover plate removed to expose the internal mechanism.

In the drawings 10 denotes the body of a linear dimension gauge, 11 the handle, 12 the dial and 13 the stylus which is pivotally mounted on a screw pivot 14. The internal mechanism of the gauge forms no part of the present invention but it may here be mentioned that (see FIGS. 10 and 11) a ratchet tooth connection 1 is provided between one end of the stylus and one end of a transmission lever 2 pressed by a spring 3, the other end of the lever being operatively connected to a spindle 4 which in turn is operatively connected to an indicator needle or equivalent member 5 co-operating with the graduated circular dial 12 which is located under a glass cover 6 in a circular casing 7 secured to the body portion 10. In use deflections of the stylus 13 will cause corresponding deflections of the lever 2 in a plane about the screw pivot 14 under the control of the spring 3 acting on the lever 2 and will produce a corresponding rotation of the spindle 4 causing corresponding rotary deflection of the needle or equivalent member with respect to the dial 12. For a more detailed description of the internal mechanism reference may be made to British patent specification No. 720,132.

The ratchet tooth connection 1 permits the stylus to be turned on the screw pivot 14 in steps corresponding to the pitch of the ratchet teeth.

Figure 1:
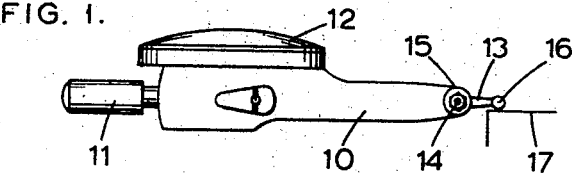
Figure 2:
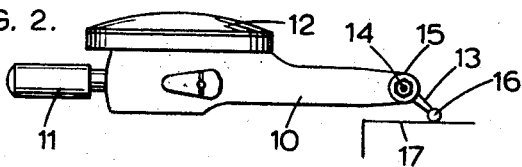
FIG. 2 is a view similar to FIG. 1 showing the stylus in a tilted position.
Figure 3:
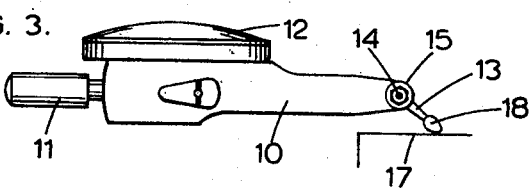
FIG. 3 is a view of a similar gauge in which the free end of the stylus is shaped in accordance with the invention.

In the known device shown in FIGS. 1 and 2 the free end of the stylus terminates in a spherical ball 16 which makes contact with the surface of the workpiece 17. In the normal working position the stylus extends in the same plane as the body 10 as shown in FIG. 1 and the workpiece 17 is moved transversely of the stylus. It is sometimes desirable to move the workpiece lengthwise of the body and in order in this case to enable the workpiece to clear the body the stylus is tilted downwardly into, for example, the position shown in FIG. 2. A disadvantage resulting from tilting the stylus is that the distance between the working centres is shortened with the consequence that an incorrect reading is obtained on the dial. In a gauge made in accordance with the invention this disadvantage is overcome by replacing the ball by a tapered end 18 (FIG. 3) which is designed so that when the stylus is tilted through a limited angle, say up to 40°, the horizontal distance between the working centres remains constant.

Figure 4:
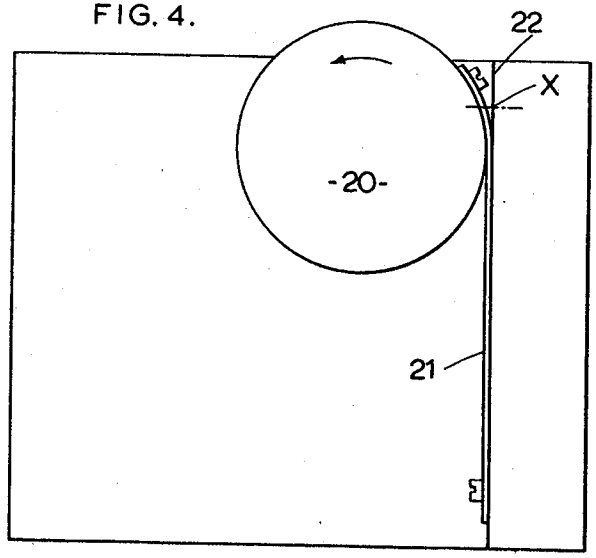
FIG. 4 illustrates the way in which the profile of the free end of the stylus of FIG. 3 is determined.
Figure 5:
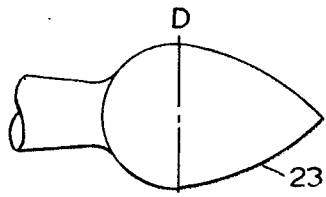
FIG. 5 illustrates the profile produced by the method illustrated in FIG. 4.

The required profile of the tapered end 18 is dependent on the diameter D (see FIG. 5) and the distance between the working centres and can be determined by the method shown in FIG. 4. In this figure the reference number 20 denotes a steel disc to which is attached one end of a strip 21, the other end of which is attached to a straight edge 22. Assuming that the diameter D of the tapered end is 0.115″ and the working centres above referred to are spaced 0.306″ apart, the radius of the disc must be 0.306″ including the thickness of the strip 21. If the disc 20 is rolled along the straight edge 22 the true form of the required profile will be traced by a point X on the disc which is initially in line with the straight edge and which falls a distance equal to half the diameter D, i.e. 0.0575″, during the operation. The shape of the profile thus obtained is indicated by the thick line 23 in FIG. 5. In the embodiment described there are 30 teeth on the stylus ratchet, the tooth spacing being 12°. The stylus can thus be tilted through successive angles of 12° and held in the tilted position by the ratchet.

FIG. 6 illustrates the point of contact A of the tapered end with the surface of the workpiece when the stylus extends in the plane of the body and FIGS. 7, 8 and 9 illustrate respectively the points of contact A with the workpiece when the stylus is tilted through angles of 12°, 24° and 36° respectively. In FIGS. 7, 8 and 9 the point of contact A is shifted so that the distance between the points of contact A and the centre of the pivot pin, i.e. between the working centres, remains constant at 0.306″ and the indicator accordingly gives an accurate reading when the stylus is in each of the tilted positions illustrated.

In a modification of the embodiment described the ratchet connection between the end 15 of the stylus and the transmission is eliminated and replaced by a frictional connection.

What I claim and desire to secure by Letters Patent is:
1. A linear dimension gauge comprising a body, a spring pressed stylus having one end pivotally mounted on the body so that its free end can bear on the surface of the workpiece, with the pivot about which said stylus turns and a point on said free end which bears on the working surface constituting working centers, a graduated scale carried on the body, an indicator member cooperating with said graduated scale, a mechanical transmission connecting said stylus and said indicator member, and means for moving said stylus into a tilted position relative to said body, the free end of said stylus in said tilted position projecting to one side of said body, said free end of said stylus being tapered, the taper being such that the component of the distance between the working centers taken in one specific direction relative to said body remains constant in all operating positions of the stylus.

2. A linear dimension gauge as claimed in claim 1 in which the profile of the tapered end of the stylus has the contour of a segment of the cycloid generated by rolling along a straight line a circle having a radius equal to the distance between the working centers of the gauge.

References Cited in the file of this patent

UNITED STATES PATENTS

| | | |
|---|---|---|
| 1,994,256 | Simmons | Mar. 12, 1935 |
| 2,682,769 | Smith et al. | July 6, 1954 |

FOREIGN PATENTS

| | | |
|---|---|---|
| 720,132 | Great Britain | Dec. 15, 1954 |